(12) United States Patent
Moroishi et al.

(10) Patent No.: US 9,853,290 B2
(45) Date of Patent: Dec. 26, 2017

(54) COMPOSITION FOR FORMING SECONDARY BATTERY ELECTRODE, SECONDARY BATTERY ELECTRODE, AND SECONDARY BATTERY

(75) Inventors: Yasuyuki Moroishi, Tokyo (JP); Kazunori Sigemori, Tokyo (JP)

(73) Assignee: Toyo Ink SC Holdings Co., Ltd., Tokyo (JP)

( * ) Notice: Subject to any disclaimer, the term of this patent is extended or adjusted under 35 U.S.C. 154(b) by 492 days.

(21) Appl. No.: 14/125,281

(22) PCT Filed: Jun. 11, 2012

(86) PCT No.: PCT/JP2012/064869
§ 371 (c)(1),
(2), (4) Date: Dec. 10, 2013

(87) PCT Pub. No.: WO2012/173072
PCT Pub. Date: Dec. 20, 2012

(65) Prior Publication Data
US 2014/0127571 A1 May 8, 2014

(30) Foreign Application Priority Data

Jun. 15, 2011 (JP) ................................. 2011-133449
Sep. 7, 2011 (JP) ................................. 2011-194606

(51) Int. Cl.
*H01M 4/62* (2006.01)
*H01M 4/13* (2010.01)
*H01M 10/0525* (2010.01)

(52) U.S. Cl.
CPC ............... *H01M 4/62* (2013.01); *H01M 4/13* (2013.01); *H01M 4/622* (2013.01); *H01M 4/625* (2013.01); *H01M 10/0525* (2013.01); *H01M 2220/20* (2013.01); *H01M 2220/30* (2013.01); *Y02E 60/122* (2013.01)

(58) Field of Classification Search
CPC ........ H01M 4/62; H01M 4/622; H01M 4/625; H01M 4/13; H01M 10/0525; H01M 2220/20; Y02E 60/122
See application file for complete search history.

(56) References Cited

U.S. PATENT DOCUMENTS

| | | |
|---|---|---|
| 6,756,153 B1 | 6/2004 | Yamamoto et al. |
| 2004/0062989 A1 | 4/2004 | Ueno et al. |
| 2009/0316334 A1 | 12/2009 | Fukumine et al. |
| 2010/0248034 A1 | 9/2010 | Oki et al. |
| 2012/0095131 A1 | 4/2012 | Kinoshita et al. |

FOREIGN PATENT DOCUMENTS

| | | |
|---|---|---|
| JP | 02-158055 A | 6/1990 |
| JP | 09-082364 A | 3/1997 |
| JP | 2003-142102 A | 5/2003 |
| JP | 2006-516795 A | 7/2006 |
| JP | 2009-176721 A | 8/2009 |
| JP | 2009-302009 A | 12/2009 |
| JP | 2010-021059 A | 1/2010 |
| JP | 2010-165493 A | 7/2010 |
| JP | 2010-177079 A | 8/2010 |
| JP | 2011-076910 A | 4/2011 |
| WO | WO 2004/091017 A1 | 10/2004 |
| WO | WO 2006/118235 A1 | 11/2006 |
| WO | WO 2010/114119 A1 | 10/2010 |
| WO | WO 2012/133030 A1 | 10/2012 |
| WO | WO 2012/133031 A1 | 10/2012 |

*Primary Examiner* — Eugenia Wang
(74) *Attorney, Agent, or Firm* — Foley & Lardner LLP

(57) ABSTRACT

The present invention addresses the problem of providing an electrode-forming composition, which is used for the purpose of producing a secondary battery that has excellent charge and discharge cycle characteristics, and which exhibits excellent dispersibility of an active material and a conductive assistant. The problem is solved by a composition for forming a secondary battery electrode, which contains (A) an electrode active material and/or (B) a carbon material that serves as a conductive assistant, (C) an amphoteric resin-type dispersant that is obtained by neutralizing at least some carboxyl groups in a copolymer containing aromatic rings, carboxyl groups and amino groups with a basic compound, and (D) an aqueous liquid medium.

16 Claims, No Drawings

COMPOSITION FOR FORMING SECONDARY BATTERY ELECTRODE, SECONDARY BATTERY ELECTRODE, AND SECONDARY BATTERY

TECHNICAL FIELD

The present invention relates to a composition for forming a secondary battery electrode, an electrode obtained using the composition, and a secondary battery obtained using the electrode.

BACKGROUND ART

Compact portable electronic devices such as digital cameras and cell phones have come to be widely used in recent years. These electronic devices are continuously required to minimize volume and have light weight, and the batteries installed therein are required to realize small size, light weight and large capacity. Further, the large secondary batteries for installation in automobiles and the like are also desired to realize large secondary batteries in place of conventional lead storage batteries.

In order to respond to these requirements, there has been considerable activity in the development of secondary batteries such as lithium ion secondary batteries and alkaline secondary batteries, for example, in the development of a mixture ink used to form an electrode. Further, there has been interest in a composition for forming an underlayer which is used to form an underlayer of a mixture layer.

As important characteristics which are required for the mixture ink used to form an electrode or the composition for forming an underlayer, the uniformity in proper dispersion of an active material or a conductive assistant is listed. This is because the dispersion state of the active material or the conductive assistant in the mixture ink or the dispersion state of the conductive assistant in the composition for forming an underlayer is associated with the dispersion state of the active material or the conductive assistant in the mixture layer or the dispersion state of the conductive assistant in the underlayer, influences electrode physical properties, and eventually influences the battery performance.

Therefore, dispersion of the active material or the conductive assistant is an important issue. Carbon materials having superior conductivity (conductive assistants) are difficult to uniformly mix and disperse in a mixture ink or a composition for forming an underlayer due their large structure and specific surface area resulting in strong cohesive force. When the control of dispersibility and particle size of a carbon material as a conductive assistant is insufficient, electrode internal resistance is not decreased due to lack of formation of a uniform conductive network. As a result, a problem not to get sufficient performance of electrode materials occurs.

If dispersion of active materials in not only the conductive assistant but also in the mixture ink is insufficient, partial cohesion occurs in a mixture layer formed from the mixture ink. Then, resistance is distributed on the electrode by the partial cohesion. Thus, concentration of current occurs during use as a battery, resulting in promotion of partial heating and deterioration.

Further, it is required that the mixture ink or the composition for forming an underlayer has proper fluidity to apply onto the surface of a metal foil which functions as a current collector. Furthermore, it is required that the mixture ink or the composition for forming an underlayer has proper viscosity to form a mixture layer and an underlayer which have a surface as smooth as possible and a uniform thickness.

The mixture layer formed from the mixture ink or the underlayer formed from the composition for forming an underlayer is formed. Then, each of the layers (as a metal foil substrate) is cut out or punched into a section with a desired size and shape. Then, it is required that the mixture layer or the underlayer has a hardness that is not damaged by performing cutting or punch processing and a softness that is not broken or peeled off.

Patent Documents 1 to 4 disclose that a conductive material is mixed with an active material, this mixture is kneaded with a cellulose thickener aqueous solution, an aqueous binder such as polyethylene tetrafluoride or a latex system is added thereto, and further the mixture is kneaded to prepare a mixture ink. However, the mixture ink is in an insufficient dispersion state and is lack of flexibility. Since a desired electrode cannot be produced, good battery performance is not obtained.

In order to solve these problems, a method of using a dispersant in addition to conventional materials at the time of producing the mixture ink has been developed (refer to Patent Document 5). However, good dispersion state of the mixture ink is insufficient in the use of the dispersant. Desired electrodes and secondary batteries are not obtained in many cases. Particularly, there is a need for a mixture ink in which the dispersibility of the conductive assistant is more uniform.

CITATION LIST

Patent Documents

Patent Document 1: JP 2-158055 A
Patent Document 2: JP 9-082364 A
Patent Document 3: JP 2003-142102 A
Patent Document 4: JP 2010-165493 A
Patent Document 5: JP 2006-516795 A
Patent Document 6: JP 2011-076910 A

DISCLOSURE OF INVENTION

Technical Problem

An object of the present invention is to provide a composition for forming electrode to form a secondary battery having excellent in charge-discharge cycle characteristics wherein the composition is excellent in dispersibility of an active material or a conductive assistant.

Solution to Problem

In the present invention, the dispersibility of an electrode active material (A) or a carbon material (B) as a conductive assistant can be improved by using an amphoteric resin-type dispersant (C).

That is, the present invention relates to a composition for forming a secondary battery electrode which contains at least one of the electrode active material (A) and the carbon material (B) as a conductive assistant; the amphoteric resin-type dispersant (C) prepared by neutralizing at least some carboxyl groups in a copolymer obtained by copolymerizing the following monomers with a basic compound; and an aqueous liquid medium (D):

Ethylenically unsaturated monomer having an aromatic ring (c1): 5 to 70% by weight;

Ethylenically unsaturated monomer having a carboxyl group (c2): 15 to 60% by weight;

Ethylenically unsaturated monomer having an amino group (c3): 1 to 80% by weight; and Other monomers (c4) except the monomers (c1) to (c3): 0 to 79% by weight (wherein the total of the monomers (c1) to (c4) are 100% by weight).

The present invention relates to an electrode for secondary batteries comprising a current collector and at least one of a mixture layer and an electrode underlayer formed from the composition for forming a secondary battery electrode.

Furthermore, the present invention relates to a secondary battery comprising a positive electrode, a negative electrode, and an electrolyte, wherein at least one of the positive electrode and the negative electrode is the electrode for secondary batteries.

Advantageous Effects of Invention

The use of the amphoteric resin-type dispersant allows the dispersibility of the active material and the carbon material as a conductive assistant to be improved. The composition for forming an electrode of the present invention could be obtained. The composition for forming an electrode of the present invention can form a mixture layer or an underlayer which are excellent in flexibility and adhesion to the current collector and can provide a secondary battery having excellent charge-discharge cycle characteristics.

BEST MODE FOR CARRYING OUT THE INVENTION

The electrode for secondary batteries can be obtained by various methods.

For example, a mixture layer is formed on the surface of a current collector such as metal foil using (1) an ink-like composition containing an active material and a liquid medium (hereinafter referred to as "mixture ink"), (2) a mixture ink containing an active material, a conductive assistant, and a liquid medium, (3) a mixture ink containing an active material, a binder, and a liquid medium or (4) a mixture ink containing an active material, a conductive assistant, a binder, and a liquid medium to obtain an electrode.

Alternatively, an underlayer is formed on the surface of a current collector of metal foil using a composition for forming an underlayer which contains a conductive assistant and a liquid medium and a mixture layer is formed on the underlayer using the mixture inks (1) to (4) or other mixture inks so that an electrode can be obtained.

In any of these cases, the fact that the dispersion state of the active material or the conductive assistant is influenced by battery performance is described in detail in the clause of "Background art".

The amphoteric resin-type dispersant (C) relaxes aggregation of the active material or functions as a dispersant relative to the carbon material as a conductive assistant.

Therefore, the composition for forming a secondary battery electrode of the present invention can be used as a mixture ink which essentially contains an active material or a composition for forming an underlayer which does not essentially contain an active material.

First, the amphoteric resin-type dispersant (C) in the present invention will be described. The amphoteric resin-type dispersant (C) in the present invention is obtained by neutralizing at least some carboxyl groups in a copolymer which contains the ethylenically unsaturated monomer (c1) having an aromatic ring, the ethylenically unsaturated monomer (c2) having a carboxyl group, and the ethylenically unsaturated monomer (c3) having an amino group as essential components with a basic compound.

First, the ethylenically unsaturated monomer having an aromatic ring (c1) will be described. Examples of the ethylenic unsaturated monomer (c1) having an aromatic ring to be used in the present invention include styrene, α-methylstyrene, and benzyl(meth)acrylate.

Subsequently, the ethylenically unsaturated compound having a carboxyl group (c2) will be described. As for the monomer (c2) used in the present invention, examples of unsaturated compound containing a carboxyl group include maleic acid, fumaric acid, itaconic acid, citraconic acid, or alkyls or alkenyl monoesters thereof, phthalic acid β-(meth)acryloxyethyl monoester, isophthalic acid β-(meth)acryloxyethyl monoester, terephthalic acid β-(meth)acryloxyethyl monoester, succinic acid β-(meth)acryloxyethyl monoester, acrylic acid, methacrylic acid, crotonic acid, and cinnamic acid. Particularly, methacrylic acid and acrylic acid are preferred.

Subsequently, the ethylenically unsaturated monomer (c3) having an amino group will be described. Examples of ethylenically unsaturated monomers (c3) having an amino group to be used in the present invention include dimethylaminoethyl(meth)acrylate, diethyl aminoethyl(meth)acrylate, methylethylaminoethyl(meth)acrylate, dimethylamino styrene, and diethylamino styrene.

Subsequently, other monomers (c4) except the above monomers (c1) to (c3) will be described. Examples of (meth)acrylate compounds include alkyl(meth)acrylate and alkylene glycol(meth)acrylate.

More specific examples of alkyl(meth)acrylate include alkyl(meth)acrylate having 1 to 22 carbon atoms such as methyl(meth)acrylate, ethyl(meth)acrylate, propyl(meth)acrylate and butyl(meth)acrylate. When the polarity is intended to be adjusted, examples thereof include an alkyl group containing acrylate having an alkyl group having preferably 2 to 10 carbon atoms 2-10, more preferably 2 to 8 carbon atoms or the corresponding methacrylates.

Examples of alkylene glycol(meth)acrylate include monoacrylate having a hydroxyl group and a polyoxyalkylene chain at the end or the corresponding monomethacrylates such as diethylene glycol mono(meth)acrylate and polyethylene glycol mono(meth)acrylate; monoacrylate having an alkoxy group and a polyoxyalkylene chain at the end or the corresponding monomethacrylates such as methoxy ethylene glycol(meth)acrylate and methoxy diethylene glycol(meth)acrylate; and polyoxyalkylene acrylate having a phenoxy or aryloxy group at the end or the corresponding methacrylates such as phenoxyethylene glycol(meth)acrylate.

Examples of the unsaturated compounds containing a hydroxyl group except the above examples include 2-hydroxyethyl(meth)acrylate, 2-hydroxypropyl(meth)acrylate, 4-hydroxy butyl(meth)acrylate, glycerol mono(meth)acrylate, and 4-hydroxy vinylbenzene.

Examples of nitrogen containing unsaturated compounds include acrylamide unsaturated compounds such as (meth)acrylamide, N-methylol(meth)acrylamide, N-methoxymethyl(meth)acrylamide mono-alkylol(meth)acrylamide; N,N-di(methylol)acrylamide, N-methylol-N-methoxymethyl(meth)acrylamide, N,N-di-(methoxymethyl) acrylamide, and dialkylol(meth)acrylamide.

Further, other examples of unsaturated compounds include perfluoroalkylalkyl(meth)acrylates having a perfluoroalkyl group having 1 to 20 carbon atoms such as perfluoromethylmethyl(meth)acrylate, perfluoroethylmethyl (meth)acrylate, 2-perfluorobutylethyl(meth)acrylate, and 2-perfluorohexylethyl(meth)acrylate; perfluoroalkyl group containing vinyl monomers, for example, perfluoroalkylalkylenes such as perfluoro butyl ethylene, perfluoro hexylethylene, perfluoro octylethylene, perfluoro decylethylene; silanol group containing vinyl compounds such as vinyl trichlorosilan, vinyltris(β-methoxyethoxy) silane, vinyltriethoxysilane, γ-(meth)acryloxyprophyltrimethoxysilane, and derivatives thereof. A plurality of these groups can be used.

Examples of fatty acid vinyl compounds include vinyl acetate, vinyl butyrate, vinyl propionate, vinyl hexanoate, vinyl caprylate, vinyl laurate, vinyl palmitate, and vinyl stearate.

Examples of alkyl vinyl ether compounds include butyl vinyl ether and ethyl vinyl ether.

Examples of α-olefin compounds include 1-hexene, 1-octene, 1-decene, 1-dodecen, 1-tetra decene, and 1-hexa decene.

Examples of vinyl compounds include allyl compounds, such as allyl acetate, allyl alcohol, allylbenzene, and vinylaceto nitrile; vinyl cyanide, vinylcyclohexane, vinyl methyl ketone, styrene, α-methylstyrene, 2-methylstyrene, and chloro styrene.

Examples of ethynyl compounds include acetylene, ethynylbenzene, ethynyltoluene, and 1-ethynyl-1-cyclohexanol. These compounds may be used alone or in combination with two or more kinds thereof.

As for the ratio of the monomer forming a copolymer in the amphoteric resin-type dispersant (C) used in the present invention, when the total of the monomers (c1) to (c4) is 100% by weight, the ethylenically unsaturated monomer having an aromatic ring (c1) is from 5 to 70% by weight, the ethylenically unsaturated monomer having a carboxyl group (c2) is from 15 to 60% by weight, the ethylenically unsaturated monomer having an amino group (c3) is from 1 to 80% by weight, and other monomers (c4) except the monomers (c1) to (c3) is from 0 to 79% by weight. Preferably, the (c1) is from 20 to 70% by weight, the (c2) is from 15 to 45% by weight, the (c3) is from 1 to 70% by weight, and the (c4) is from 0 to 50% by weight. More preferably, the (c1) is from 30 to 70% by weight, the (c2) is from 15 to 35% by weight, the (c3) is from 1 to 40% by weight, and the (c4) is from 0 to 40% by weight.

The aromatic ring derived from the ethylenically unsaturated monomer (c1) having an aromatic ring and the amino group derived from the ethylenically unsaturated monomer (c3) having an amino group are main adhesion sits to the active material (A) to be described below or a conductive assistant (B).

The ethylenically unsaturated monomer (c2) having a carboxyl group serves a function of dissolving or dispersing a neutralized substance of the copolymer in the aqueous liquid medium. Then, it is considered due to the fact that the copolymer is adsorbed to the active material (A) and the conductive assistant (B) through an aromatic ring or an amino group and neutralized, and then the dispersion state of the active material (A) of the conductive assistant (B) in the aqueous liquid medium can be stably maintained by the charge repulsion of the ionized carboxyl groups.

The molecular weight of the copolymer formed by copolymerization of the monomers (c1) to (c4) is not particularly limited. The viscosity of an aqueous solution with 20% solid content of the amphoteric resin-type dispersant (C) is preferably from 5 to 100,000 mPa·s, more preferably from 10 to 50,000 mPa·s. When the viscosity is lower than a predetermined range and the molecular weight of the amphoteric resin-type dispersant (C) is too low, or when the viscosity is higher than a predetermined range and the molecular weight of the amphoteric resin-type dispersant (C) is too high, poor dispersion of the electrode active material (A) or the carbon material (B) as a conductive assistant may be caused. In this regard, the viscosity in the present invention is a value measured at 25° C. using the Brookfield viscometer.

The copolymer is formed by copolymerization of the unsaturated monomer (c2) having a carboxyl group. If the component ratio of a monomer having an anionic functional group in the copolymer is represented by an acid value, it is preferably as follows. That is, the acid value of the copolymer to be used is preferably from 50 to 400 mgKOH/g, more preferably from 80 to 300 mgKOH/g. If the acid value of the copolymer used in the present invention is lower than the above range, the dispersion stability of the dispersion decreases and the viscosity tends to increase. Further, if the acid value of the copolymer used in the present invention is higher than the above range, the adhesion force of the copolymer to the pigment surface decreases and the storage stability of the dispersion tends to decrease. The acid value of the copolymer in the present invention is a value obtained by calculating the acid value (mgKOH/g) measured by potentiometric titration in accordance with JIS K 0070 in terms of the solid content.

The amphoteric resin-type dispersant (C) can be obtained by various production methods. For example, the above monomers (c1) to (c4) are polymerized in an organic solvent which can be azeotropic with water. Thereafter, an aqueous liquid medium represented by water and a neutralizer (basic compound) are added to neutralize at least some carboxyl groups. The solvent which can be azeotropic is distilled and an aqueous solution or aqueous dispersion of the amphoteric resin-type dispersant (C) can be obtained. As the organic solvent at the time of polymerization, one which can be azeotropic with water may be used, and one having high solubility to a copolymer is preferred. Ethanol, 1-propanol, 2-propanol, and 1-butanol are preferred, and 1-butanol is more preferred.

Alternatively, the monomers are copolymerized in a hydrophilic organic solvent, followed by addition of water and amine to neutralize and make it aqueous. As described above, the hydrophilic organic solvent is not distilled so that a solution in which the amphoteric resin-type dispersant (C) is dissolved or dispersed in the aqueous liquid medium containing the hydrophilic organic solvent and water can be obtained. In this case, as the hydrophilic organic solvent to be used, one having high solubility to the copolymer is preferred. Glycol ether and diol are preferred. (Poly)alkylene glycol monoalkyl ether and alkanediol having 3 to 6 carbon atoms are further preferred.

Examples of neutralizers (basic compound) used to neutralize the copolymer include the followings. For example, various organic amines such as aqueous ammonia, dimethylaminoethanol, diethanolamine, and triethanolamine; and inorganic alkali agents such as hydroxides of alkali metals such as sodium hydroxide, lithium hydroxide, and potassium hydroxide. The above copolymer is dispersed or dissolved in an aqueous liquid medium.

<Mixture Ink>

As described above, the composition for forming a secondary battery electrode of the present invention can be used as a mixture ink or a composition for forming an underlayer.

Then, the mixture ink essentially containing an active material which is one preferred embodiment of the composition for forming a secondary battery electrode of the present invention will be described. As the mixture ink, there is a positive-electrode mixture ink or a negative electrode mixture ink. As already described, there are various forms as exemplified as the following inks (1) to (4):

(1) a mixture ink containing the active material (A), and the amphoteric resin-type dispersant (C), and the aqueous liquid medium (D);

(2) a mixture ink further containing the conductive assistant (B), in addition to the above (1);

(3) a mixture ink further containing the binder, in addition to the above (1); and (4) a mixture ink further containing the conductive assistant (B) and the binder, in addition to the above (1).

A positive electrode active material for lithium ion secondary batteries is not particularly limited. Metal compounds which can dope or intercalate lithium ions, such as metal oxides and metal sulfides; and conductive polymers and the like can be used. Examples thereof include oxides of transition metals, such as Fe, Co, Ni, and Mn; complex oxides with lithium; and inorganic compounds such as transition metal sulfides. Specific examples thereof include transition metal oxide powders such as MnO, $V_2O_5$, $V_6O_{13}$ or $TiO_2$, complex oxide powders of lithium and a transition metal such as lithium nickel oxide, lithium cobalt oxide or lithium manganese oxide having a layered structure or lithium manganese oxide having a spinel structure, phosphoric acid compounds having an olivine structure in the form of lithium iron phosphate, and transition metal sulfide powders such as $TiS_2$ or FeS. Further, conductive polymers such as polyaniline, polyacethylene, polypyrrole, and polythiophene can be used. The inorganic compounds and the organic compounds may be mixed for use.

A negative electrode active material for lithium ion secondary batteries is not particularly limited as long as it can dope or intercalate lithium ions. Examples thereof include:

alloy systems such as metal lithium, or alloy system such as tin alloy, silicon alloy, and lead alloy that they are alloys thereof; metal oxide systems such as $Li_xFe_2O_3$, $Li_xFe_3O_4$, $Li_xWO_2$, lithium titanate, lithium vanadate, and lithium silicate; conductive polymer systems, such as polyacethylene and poly-p-phenylene; amorphous carbonaceous materials such as soft carbon and hard carbon; artificial graphite such as highly graphitized carbon material or carbonaceous powders such as naturally-occurring graphite; and carbon-based materials such as carbon black, mesophase carbon black, resin-baked carbon materials, vapor growth carbon fibers, and carbon fibers. These negative electrode active materials can be used in combination with one or plural kinds thereof.

As the positive and negative electrode active materials for alkaline secondary batteries, it is possible to appropriately select conventionally known materials.

The size of these active materials (A) is preferably from 0.05 to 100 μm, more preferably from 0.1 to 50 μm. The dispersed particle diameter of the active material (A) in the mixture ink is preferably from 0.5 to 20 μm. The dispersed particle diameter as referred here indicates the particle diameter that yields a value of 50% when calculated as the volume ratio of the particles starting with those having a small particle diameter within the volumetric particle size distribution thereof (D50), and is measured with a general particle size distribution analyzer such as a dynamic light scattering type particle size distribution analyzer (such as the "MicroTrack UPA".

Subsequently, the carbon material (B) as a conductive assistant will be described. The carbon material (B) as a conductive assistant in the present invention is not particularly limited as long as it is a carbon material having conductivity. Graphite, carbon black, conductive carbon fibers (carbon nanotubes, carbon nano fibers, and carbon fibers), and fullerene can be used alone or in combination with two or more kinds thereof. From the viewpoint of conductivity, easy availability, and cost, it is preferable to use carbon black.

Examples of carbon black include various kinds thereof such as furnace black, produced by continuously thermally decomposing a gas or liquid raw material in a reaction furnace, ketjen black using ethylene fuel oil for the raw material in particular, channel black precipitated by burning a raw material gas and rapidly cooling the flame by contacting with the bottom of channel steel, thermal black obtained by periodically repeating combustion and thermal decomposition of gas for the raw material, or acetylene black using acetylene gas for the raw material in particular. They can be used alone or in combination with two or more kinds thereof. Further, carbon black subjected to ordinary oxidation treatment or hollow carbon and the like can also be used.

Carbon oxidation treatment is generally carried out for improving the dispersibility of carbon, for example, by treating carbon at a high temperature in air, secondarily treating with nitric acid, nitrogen dioxide or ozone and the like, or treating by directly introducing (covalently bonding) onto the carbon surface an oxygen-containing polar functional group such as a phenol group, quinone group, carboxyl group or carbonyl group. However, since the conductivity of carbon generally decreases the greater the number of functional groups introduced, the use of carbon not subjected to oxidation treatment is preferable.

The larger the value of the specific surface area of the carbon black used the better, and in order to increase contact points between carbon black particles, it is advantageous to lower the internal resistance of the electrodes. Specifically, the specific surface area (BET) of the carbon black used as determined from the amount of adsorbed nitrogen is from 20 to 1500 $m^2/g$, preferably from 50 to 1500 $m^2/g$, more preferably 100 to 1500 $m^2/g$. If carbon black having a specific surface area of less than 20 $m^2/g$ is used, it may be difficult to obtain sufficient conductivity, while if carbon black having a specific surface area greater than 1500 $m^2/g$ is used, it may be difficult to acquire commercially available materials.

Further, the particle diameter of the carbon black used in terms of the primary particle diameter thereof is preferably from 0.005 to 1 μm, particularly preferably from 0.01 to 0.2 μm. However, the primary particle diameter referred to here is the average of particle diameter as measured with an electron microscope and the like.

The dispersed particle diameter in the mixture ink of the carbon material (B) as a conductive assistant is preferably reduced to a particle diameter of 0.03 to 5 μm. The dispersed particle diameter of the carbon material as a conductive assistant is less than 0.03 μm, it may be difficult to produce a composition thereof. Further, if the dispersed particle diameter of the carbon material as a conductive assistant, exceeds 2 μm, problems may occur such as fluctuations in the distribution of resistance in the electrodes and the distribution of materials in the mixture coating film. The dispersed particle diameter as referred here indicates the particle diameter that yields a value of 50% when calculated as the volume ratio of the particles starting with those having a small particle diameter within the volumetric particle size distribution thereof (D50), and is measured with a general particle size distribution analyzer such as a dynamic light scattering type particle size distribution analyzer (such as the "MicroTrack UPA").

Examples of commercially available carbon black include, but are not limited to, TOKABLACK #4300, #4400, #4500 or #5500 (furnace black, manufactured by Tokai Carbon Co., Ltd.), Printex L (furnace black, manufactured by Degussa), Raven 7000, 5750, 5250, 5000ULTRAIII or 5000ULTRA, Conductex SC ULTRA or Conductex 975 ULTRA, PUER BLACK 100, 115, 205 (furnace black, manufactured by Columbian Chemicals Company), #2350, #2400B, #2600B, #3005OB, #3030B, #3230B, #3350B, #3400B or #5400B (furnace black, manufactured by Mitsubishi Chemical Corporation), MONARCH 1400, 1300, 900, Vulcan XC-72R or Black Pearls 2000 (furnace black, manufactured by Cabot Corporation), Ensaco250G, Ensaco260G, Ensaco350G, SuperP-Li (manufactured by TIMCAL GRAPHITE & CARBON), Ketjen Black EC-300J or EC-600JD (manufactured by Akzo Nobel), and Denka Black, Denka Black HS-100 or FX-35 (acetylene black, manufactured by Denki Kagaku Kogyo Kabushiki Kaisha). Examples of graphite include, but are not limited to, artificial graphite and naturally-occurring graphite such as scaly graphite, lump graphite, earthy graphite. They may be used in combination with two or more kinds thereof.

As the conductive carbon fiber, one obtained by baking a petroleum-derived raw material is preferred. One obtained by baking a plant-derived raw material can also be used. For example, VGCF (manufactured by Showa Denko K.K.) which is produced from a petroleum-derived raw material can be listed.

Subsequently, the aqueous liquid medium (D) will be described. As the aqueous liquid medium (D) to be used in the present invention, it is preferable to use water. If necessary, for example, a liquid medium which is compatible with water may be used in order to improve coating properties onto the current collector. Examples of the liquid medium which is compatible with water include alcohols, glycols cellosolves, aminoalcohols, amines, ketones, carboxylic acid amides, phosphoric acid amides, sulfoxides, carboxylic acid esters, phosphoric acid esters, ethers, and nitriles. They may be used in a range that is compatible with water.

Further, the mixture ink can contain a binder. The binder in the present invention is used to bind the conductive assistant or particles such as other active materials. The effect of dispersing these particles in solvents is small.

Examples of the binder include acrylic resin, polyurethane resin, polyester resin, phenol resin, epoxy resin, phenoxy resin, urea resin, melamine resin, alkyd resin, formaldehyde resin, silicon resin, fluorine resin; cellulosic resins such as carboxymethylcellulose; synthetic rubbers such as styrene-butadiene rubber and fluororubber; conductive resins such as polyaniline and polyacethylene; and polymer compounds containing a fluorine atom, such as polyvinylidene fluoride, polyvinyl fluoride, and tetrafluoroethylene. Further, modified forms, mixtures, and copolymers of these resins may also be used. These binders can be used in combination with one or plural kinds thereof.

Further, if necessary, a film-forming assistant, a defoamant, a leveling agent, an antiseptic, a pH adjuster, a viscosity modifier or the like can be added to the mixture ink.

Although the viscosity varies depending on the coating method, the viscosity of the mixture ink is preferably from 100 to 30,000 mPa·s based on a solid content of 30 to 90% by weight. It is preferable that the amount of the active material (A) is as large as possible within a coatable viscosity range. For example, the ratio of the active material (A) to the solid content in the mixture ink is preferably from 80 to by weight. The ratio of the amphoteric resin-type dispersant (C) to the solid content in the mixture ink is preferably from 0.1 to 15% by weight. When the conductive assistant (B) is included, the ratio of the conductive assistant (B) to the solid content in the mixture ink is preferably from 0.1 to 15% by weight. When the binder is included, the ratio of the binder to the solid content in the mixture ink is preferably from 0.1 to 15% by weight.

The mixture ink can be obtained by various methods. They will be described taking the case of the mixture ink (4) which contains the active material (A), the conductive assistant (B), the amphoteric resin-type dispersant (C), the binder, and the aqueous liquid medium (D). For example, (4-1), an aqueous dispersion of an active material containing the active material (A), the amphoteric resin-type dispersant (C), and the aqueous liquid medium (D) is prepared, the conductive assistant (B) and the binder are added to the aqueous dispersion so that a mixture ink can be prepared. The conductive assistant (B) and the binder can be simultaneously added, or the binder may be added after addition of the conductive assistant (B). Alternatively, the conductive assistant (B) may be added after addition of the binder.

(4-2) An aqueous dispersion of a conductive assistant containing the conductive assistant (B), the amphoteric resin-type dispersant (C), and the aqueous liquid medium (D) is prepared, and the active material (A) and the binder are added to the aqueous dispersion so that a mixture ink can be prepared. The active material (A) and the binder can be simultaneously added, or the binder may be added after addition of the active material (A). Alternatively, the active material (A) may be added after addition of the binder.

(4-3) An aqueous dispersion of an active material containing the active material (A), the amphoteric resin-type dispersant (C), the binder, and the aqueous liquid medium (D) is prepared, and the conductive assistant (B) is added to the aqueous dispersion so that a mixture ink can be prepared.

(4-4) An aqueous dispersion of a conductive assistant containing the conductive assistant (B), the amphoteric resin-type dispersant (C), the binder, and the aqueous liquid medium (D) is prepared, and the active material (A) is added to the aqueous dispersion so that a mixture ink can be prepared.

(4-5) The active material (A), the conductive assistant (B), the amphoteric resin-type dispersant (C), the binder, and the aqueous liquid medium (D) are mixed almost simultaneously so that a mixture ink can be prepared.

(Disperser and Mixer)

As a device to be used when obtaining a mixture ink, a disperser or mixer usually used to disperse pigment and the like can be used. Examples thereof include, but are not limited to, mixers such as a disper mixer, homomixer or planetary mixer; homogenizers (such as "Clearmix" by M Technique Co., Ltd. or "Filmix" manufactured by Primix Corporation); media-type dispersers such as a paint conditioner (Red Devil Inc.), ball mill, sand mill (such as "Dynomill" manufactured by Shinmaru Enterprises Corp.), attriter, pearl mill (such as "DCP Mill" manufactured by Eirich) or coball mill; wet jet mills (such as "Genus PY" manufactured by Genus Co., Ltd., "Starburst" manufactured by Sugino Machine Ltd., or "Nanomizer" manufactured by Nanomizer Inc.), media-less dispersers such as "Clear SS-5" manufactured by M Technique Co., Ltd. or "MICROS" manufactured by Nara Machinery Co., Ltd. and other rolling mills. Preferably, dispersers subjected to treatment for preventing the disperser from being contaminated by metal are used.

For example, in the case of using a media-type disperser, it is preferable to use a method in which the agitator and vessel use a disperser made of ceramic or plastic, and a disperser in which a metal agitator and vessel surface are treated with tungsten carbide thermal spraying or resin coating and the like. Glass beads or ceramic beads such as zirconia beads or alumina beads are preferably used for the media. Further, in the case of using a rolling mill, it is preferable to use a ceramic roller. Only one type of dispersion device may be used or a plurality of types of devices may be used in combination. Further, in the case of the positive or negative electrode active material whose particles are easily broken or crushed by a strong impact, media-less dispersers such as a roll mill and a homogenizer are preferred rather than the media-type disperser.

<Composition for Forming Underlayer>

As described above, the composition for forming a secondary battery electrode of the present invention can be used as the mixture ink and the composition for forming an underlayer. The composition for forming an underlayer contains the conductive assistant (B), the amphoteric resin-type dispersant (C), and the aqueous liquid medium (D). Further, it can contain the binder. Respective components are the same as those of the case of the mixture ink.

The ratio of the carbon material (B) as the conductive assistant to the solid content in the composition used for the electrode underlayer is preferably from 5 to 95% by weight, more preferably from 10 to 90% by weight. If the amount of the carbon material (B) as the conductive assistant is small, the conductivity of the underlayer may not be maintained. On the other hand, if the amount of the carbon material (B) as the conductive assistant is too large, the resistance of the coating film may be reduced. Although the viscosity varies depending on the method for coating the ink of the electrode underlayer, the proper viscosity of the ink of the electrode underlayer is generally from 10 to 30,000 mPa·s.

<Electrode>

The mixture ink of the composition for forming a secondary battery electrode of the present invention is applied onto a current collector and dried to form a mixture layer so that an electrode for secondary batteries can be obtained. Alternatively, the composition for forming an underlayer formation of the composition for forming a secondary battery electrode of the present invention is applied onto a current collector to form an underlayer and a mixture layer is formed on the underlayer so that an electrode for secondary batteries can be obtained. The mixture layer to be formed on the underlayer may be formed using the mixture inks (1) to (4) of the present invention or can also be formed other mixture inks.

(Current Collector)

The material and shape of the current collectors used in the electrodes are not particularly limited. Various materials or shapes suitable for secondary batteries can be appropriately selected. Examples of the material of the current collector include metals or alloys such as aluminium, copper, nickel, titanium or stainless steel. In the case of the lithium ion battery, aluminium is particularly preferred as a positive electrode material, and copper is preferred as a negative electrode material. Further, a foil on a flat plate is generally used for the shape. One having a roughened surface, one in the form of a porous foil or one in the form of a mesh can also be used as the current collector.

A method for coating a current collector with the mixture ink or the composition for forming an underlayer is not particularly limited, and any known method can be used. Specific examples thereof can include die coating, dip coating, roll coating, doctor coating, knife coating, spray coating, gravure coating, screen printing and electrostatic coating. As the drying method, leave-drying, a blast dryer, a hot blast dryer, an infrared-heating device, a far-infrared heating device or the like can be used, however it is not particularly limited thereto. In addition, rolling treatment may also be carried out following coating using a platen press or calendar roll. The thickness of the mixture layer of the electrode is generally from 1 to 500 μm, preferably from 10 to 300 μm. When the underlayer is comprised, the total of the thickness of the underlayer and the mixture layer is generally from 1 to 500 μm, preferably from 10 to 300 μm.

<Secondary Battery>

A secondary battery can be obtained by using the above electrode for at least one of a positive electrode or a negative electrode. As the secondary battery, an alkaline secondary battery, a lead storage battery, a sodium sulphur secondary battery, a lithium air secondary battery or the like is listed in addition to the lithium ion secondary battery. In each of the secondary batteries, conventionally known electrolytes and separators can be appropriately used.

(Electrolyte)

It will be described taking the case of a lithium ion secondary battery as an example. As the electrolyte, one prepared by dissolving an electrolyte containing lithium in a non-aqueous solvent is used. Examples of the electrolyte include, but are not limited to, $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, LiAlCl, $LiHF_2$, LiSCN, and $LiBPh_4$.

The non-aqueous solvent is not particularly limited. Examples thereof include carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethyl sulfoxide and sulfolane; and nitriles such as acetonitrile. These solvents may be used alone or may also be used by mixing two or more kinds thereof.

Moreover, the electrolyte can also be retained in a polymer matrix to form a polymer electrolyte in the form of a gel. Examples of the a polymer matrix include, but are not limited to, acrylate resin having a polyalkylene oxide segment, polyphosphazene resin having a polyalkylene oxide segment and polysiloxane having a polyalkylene oxide segment.

(Separator)

Examples of separators include, but are not particularly limited to, polyethylene non-woven fabric, polypropylene non-woven fabric, polyamide non-woven fabric, and hydrophilic treated thereof.

(Structure and Configuration of Battery)

The structure of the lithium ion secondary battery using the composition of the present invention is not particularly limited. Usually, it is comprised of a positive electrode and a negative electrode, and a separator which is formed, if necessary. It can have various shapes according to the purpose for use, such as paper, cylindrical, button, and stacked shape.

EXAMPLES

Although the following provides a more detailed explanation of the present invention based on the following examples, the scope of right of the present invention is not limited by these examples. In the examples and comparative examples, "parts" refer to "parts by weight".

Synthesis Example 1

200.0 parts of n-butanol were added to a reaction vessel equipped with a gas introduction pipe, a thermometer, a condenser, and a stirrer, followed by replacement with nitrogen gas. The inside of the reaction vessel was heated tot 110° C. A mixture containing 100.0 parts of styrene, 60.0 parts of acrylic acid, 40.0 parts of dimethylaminoethyl methacrylate, and 12.0 parts of V-601 (manufactured by Wako Pure Chemical Industries, Ltd.) was dropped thereinto over 2 hours, followed by polymerization reaction. After the end of dropping, the reaction was further carried out at 110° C. for 3 hours. Thereafter, 0.6 part of V-601 (manufactured by Wako Pure Chemical Industries, Ltd.) was added. Further, the reaction was continued at 110° C. for 1 hour to obtain a solution of a copolymer (1). The acid value of the copolymer (1) was 219.1 (mgKOH/g). After cooling the copolymer to room temperature, 74.2 parts by weight of dimethylamino ethanol was added thereto to neutralize it. This is an amount for neutralizing 100% acrylic acid. 400 parts by weight of water were added to allow it to be aqueous. Thereafter, the resulting solution was heated to 100° C. and butanol was distilled by azeotropy of butanol and water. The resulting solution was diluted with water to prepare an aqueous solution or aqueous dispersion of the amphoteric resin-type dispersant (1) having a nonvolatile content of 20%. Further, the viscosity of the aqueous solution of the amphoteric resin-type dispersant (1) having a nonvolatile content of 20% was 40 mPa·s.

Synthesis Examples 2 to 20

Dispersants of Synthesis examples 2 to 20 were prepared by synthesis with the blending composition shown in Table 1 in the same manner as Example 1.

TABLE 1

| Synthesis example | Monomer (b-1) St | Monomer (b-1) BzMA | Monomer (b-2) AA | Monomer (b-2) MAA | Monomer (b-3) DM | Monomer (b-4) BMA | neutralizer | Neutralization rate | amount of initiator to monomers (weight %) | Viscosity (mPa·s) |
|---|---|---|---|---|---|---|---|---|---|---|
| Synthesis example 1 | 50 | | 30 | | 20 | | DMAE | 100% | 6% | 40 |
| Synthesis example 2 | 50 | | 30 | | 20 | | ammonia | 100% | 6% | 160 |
| Synthesis example 3 | 50 | | 30 | | 20 | | DMAE | 75% | 6% | 35 |
| Synthesis example 4 | 65 | | 30 | | 5 | | DMAE | 100% | 6% | 35 |
| Synthesis example 5 | 50 | | | 30 | 20 | | DMAE | 100% | 6% | 35 |
| Synthesis example 6 | 60 | | 20 | | 20 | | DMAE | 100% | 6% | 35 |
| Synthesis example 7 | 50 | | 30 | | 20 | | DMAE | 100% | 2% | 2000 |
| Synthesis example 8 | 30 | | 30 | | 40 | | DMAE | 100% | 6% | 60 |
| Synthesis example 9 | | 10 | 30 | | 60 | | DMAE | 100% | 6% | 80 |
| Synthesis example 10 | 40 | | 30 | | 20 | 10 | DMAE | 100% | 6% | 40 |
| Synthesis example 15 | 40 | | 35 | | 2.5 | 22.5 | DMAE | 100% | 3% | 1000 |
| Synthesis example 16 | 67 | | | 30 | 3 | | DMAE | 100% | 6% | 30 |
| Synthesis example 17 | 45 | | | 35 | 20 | | DMAE | 100% | 2% | 2000 |
| Synthesis example 18 | 40 | | | 30 | 10 | 20 | DMAE | 100% | 6% | 35 |
| Synthesis example 19 | 10 | | 30 | | 10 | 50 | ammonia | 80% | 6% | 40 |
| Synthesis example 11 | 75 | | 20 | | 5 | | DMAE | 100% | 6% | 30 |
| Synthesis example 12 | 60 | | 40 | | | | DMAE | 80% | 6% | 30 |
| Synthesis example 13 | 3 | | 20 | | 60 | 18 | DMAE | 100% | 6% | 70 |

TABLE 1-continued

| Synthesis example | Monomer (b-1) St | Monomer (b-1) BzMA | Monomer (b-2) AA | Monomer (b-2) MAA | Monomer (b-3) DM | Monomer (b-4) BMA | Neutralization neutralizer | Neutralization rate | amount of initiator to monomers (weight %) | Viscosity (mPa·s) |
|---|---|---|---|---|---|---|---|---|---|---|
| Synthesis example 14 | 10 | | | 50 | 40 | | | | 6% | 3000 |
| Synthesis example 20 | | | 10 | 90 | | DMAE | | 100% | 6% | 500 |

St: styrene
BzMA: benzyl methacrylate
AA: acrylic acid
MAA: methacrylic acid
DM: dimethylaminoethyl methacrylate
BMA: butyl methacrylate
DMAE: dimethylaminoethanol

Example 1

10 parts of acetylene black (Denka Black HS-100) as a carbon material (i.e., a conductive assistant), 10 parts (2 parts as solid content) of an aqueous solution or aqueous dispersion of the amphoteric resin-type dispersant (1) described in Synthesis example (1), and 80 parts of water were placed into a mixer and mixed. The resulting mixture was placed into a sand mill for dispersion to prepare a carbon material dispersion for secondary battery electrodes (1).

Example 2

10 parts of acetylene black (Denka Black HS-100) as a carbon material (i.e., a conductive assistant), 10 parts of the dispersant described in Synthesis example (2), and 80 parts of water were placed into a kneader for dispersion to prepare a carbon material dispersion for secondary battery electrodes (2).

Examples 3 to 10, 28 to 32, Comparative Examples 1 to 8, and 27

The carbon materials as the conductive assistants and the dispersants shown in Table 2 were used. Carbon material dispersions for secondary battery electrodes (3) to (10) and (19) to (23) of Examples 3 to 10 and 28 to 32 and carbon material dispersions for secondary battery electrodes (11) to (18) and (24) of Comparative examples 1 to 8 and 27 were prepared in the same manner of the carbon material dispersion for secondary battery electrodes (1). The dispersion degrees as the carbon material dispersions were calculated in the following manner.

(Determination of Dispersion Degrees of Carbon Material Dispersions for Secondary Battery Electrodes and Mixture Inks)

The dispersion degrees of the carbon material dispersions for secondary battery electrodes and the mixture inks were determined by evaluating with a grind gauge (in accordance with JISK5600-2-5). Evaluation results in the case of carbon material dispersion are shown in Table 2. The numerical values in the Table indicate the sizes of coarse particles. As the numerical value is smaller, the carbon material dispersion for secondary battery electrodes has excellent dispersibility and uniformity.

TABLE 2

| | carbon material dispersions for secondary battery electrodes | | | grind gauge (μm) |
|---|---|---|---|---|
| | | Conductive assistant | dispersant | |
| Example 1 | dispersion 1 | A | Synthesis example 1 | 35 |
| Example 2 | dispersion 2 | A | Synthesis example 2 | 40 |
| Example 3 | dispersion 3 | F | Synthesis example 3 | 45 |
| Example 4 | dispersion 4 | A | Synthesis example 4 | 40 |
| Example 5 | dispersion 5 | A | Synthesis example 5 | 35 |
| Example 6 | dispersion 6 | A | Synthesis example 6 | 35 |
| Example 7 | dispersion 7 | F | Synthesis example 7 | 45 |
| Example 8 | dispersion 8 | A | Synthesis example 8 | 45 |
| Example 9 | dispersion 9 | A | Synthesis example 9 | 40 |
| Example 10 | dispersion 10 | A | Synthesis example 10 | 35 |
| Example 28 | dispersion 19 | A | Synthesis example 15 | 35 |
| Example 29 | dispersion 20 | A | Synthesis example 16 | 40 |
| Example 30 | dispersion 21 | A | Synthesis example 17 | 35 |
| Example 31 | dispersion 22 | A | Synthesis example 18 | 35 |
| Example 32 | dispersion 23 | A | Synthesis example 19 | 40 |
| Comparative example 1 | dispersion 11 | A | Synthesis example 11 | 95 |
| Comparative example 2 | dispersion 12 | F | Synthesis example 12 | 90 |
| Comparative example 3 | dispersion 13 | A | Synthesis example 13 | 95 |
| Comparative example 4 | dispersion 14 | A | Synthesis example 14 | 120 |
| Comparative example 5 | dispersion 15 | A | — | >150 |
| Comparative example 6 | dispersion 16 | A | HEC | 90 |
| Comparative example 7 | dispersion 17 | F | — | >150 |
| Comparative example 8 | dispersion 18 | F | HEC | 95 |

TABLE 2-continued

| | carbon material dispersions for secondary battery electrodes | | grind gauge (μm) |
|---|---|---|---|
| | Conductive assistant | dispersant | |
| Comparative example 27 | dispersion 24 A | Synthesis example 20 | 80 |

A: acetylene black, Denka Black HS-100 (manufactured by Denki Kagaku Kogyo Kabushiki Kaisha)
F: furnace black, Super-P Li (manufactured by TIMCAL GRAPHITE & CARBON)
HEC: hydroxyethyl cellulose As shown in Table 2, it became clear that when the carbon material dispersions for secondary battery electrodes of the present invention in Examples 1 to 10 and 28 to 32 were used, a carbon material dispersion for secondary battery electrodes having excellent dispersibility of the carbon material (B) as a conductive assistant and uniformity was obtained. It is found that the use of then amphoteric resin-type dispersant (C) allows the carbon material dispersion for secondary battery electrodes having excellent dispersibility and uniformity to be obtained, even if the kind of the conductive assistant and the kneading method differ.

<Positive Electrode Mixture Ink>, <Positive Electrode>, <Coin Shaped Battery>

Example 11

45 parts of LiFePO$_4$ as a positive electrode active material, 8.3 parts of a binder (polytetrafluoroethylene 30-J: manufactured by Dupont-Mitsui Fluorochemicals, Co., Ltd., a 60% aqueous dispersion), and 50 parts of water were mixed with 50 parts of the carbon material dispersion for secondary battery electrodes (1) prepared in Example 1 (5 parts as solid content of acetylene black) to prepare a mixture ink for secondary battery positive electrodes. The dispersion degree of the mixture ink was determined in the same manner as the cases of the dispersion degrees of the above carbon material dispersions. The mixture ink for secondary battery positive electrodes was applied onto a current collector in the form of aluminum foil having a thickness of 20 μm with a doctor blade, followed by heating under reduced pressure and drying to adjust the thickness of an electrode to 100 μm. Further, rolling treatment with a roll press was performed to produce a positive electrode having a thickness of 85 μm. The flexibility and adhesion were evaluated in the following manner.

Subsequently, a coin shaped battery formed of a separator (porous polypropylene film) inserted between a working electrode punched to have a diameter of 16 mm in the form of a previously produced positive electrode and a counter electrode in the form of metal lithium foil, and an electrolyte (non-aqueous electrolyte including LiPF$_6$ dissolved to a concentration of 1 M in a mixed solvent of ethylene carbonate and diethyl carbonate mixed at a ratio of 1:1) was assembled. The assembly of the coin shaped battery was carried out in a glove box replaced with argon gas. After the assembly of the coin shaped battery, predetermined battery characteristic evaluation was performed.

(Flexibility of Electrodes)
The above produced electrodes were formed into a stripe shape. The current collector side was wound around a metal bar having a diameter of 3 mm. The cracks on the electrode surface during winding were determined by visual observation. The electrode not having cracks has good flexibility.

◯: "No cracks (level of no practical problem)"
◯Δ: "Cracks are observed only occasionally (usable level even though there is a problem)"
Δ: "Cracks are partially observed"
X: "Cracks are observed on the whole"
(Adhesion of Electrodes)
Incisions on surfaces of the assembled electrodes were made using a knife in a depth from the electrode surface to the current collector at 2 mm interval by 6 pieces in the longitudinal and horizontal directions respectively to give a grid incision. An adhesion tape was attached to this incision and immediately peeled off, and the degree of dropping off of the active material was determined by visual determination.

Evaluation criteria are shown as follows:
◯: "No peeling off (level of no practical problem)"
◯Δ: "slight peeling off (usable level even though there is a problem)"
Δ: "Peeling off about half"
X: "Peeling off in almost all portions"
(Charge/Discharge/Storage Characteristics)

Charge/discharge measurement was performed on the obtained coin shaped battery using a charging and discharging device (SM-8, manufactured by Hokuto Denko Corp.). When the active material to be used was LiFePO$_4$, charging was continued at a charging current of 1.2 mA (up to a charging final voltage of 4.2 V). After the voltage of the battery reached 4.2 V, constant-current discharging was performed at a discharging current of 1.2 mA until the discharging final voltage reached 2.0 V. The above charging and discharging was defined as one cycle. Five cycles of charging and discharging were repeated. The discharge capacity of the 5th cycle was defined as a first cycle discharge capacity (the first cycle discharge capacity is a maintenance rate of 100%).

Subsequently, charging was performed in the same manner as the 5th cycle, followed by storage in a thermostat at 60° C. for 100 hours. Thereafter, constant current discharging was performed at a discharging current of 1.2 mA until the discharging final voltage reached 2.0 V, and the change rate was calculated (better as close to 100%).

◯: "Change rate: 95% or more (particularly excellent)"
◯Δ: "Change rate: 90% or more and less than 95% (completely no problem)"
Δ: "Change rate: 85% or more and less than 90%, (usable level even though there is a problem)"
X: "Change rate: less than 85%, (unacceptable with practical problems)"

When the active material to be used is LiCoO$_2$, the charge/discharge/storage characteristics can be measured in the same manner as the case of LiFePO$_4$, except that the charging current is set to 1.2 mA, the charging final voltage is set to 4.3 V, the discharging current is set to 1.2 mA, and the discharging final voltage is set to 2.8 V. When artificial graphite is used as the active material for negative electrodes (as will be described later), the charge/discharge/storage characteristics can be measured in the same manner as the case of LiFePO$_4$, except that the charging current is set to 1.5 mA, the charging final voltage is set to 0.1 V, the discharging current is set to 1.5 mA, and the discharging final voltage is set to 2.0 V.

Examples 12 to 20, 33 to 37, Comparative Examples 9 to 16, and 28

As shown in Table 3A, mixture inks for secondary battery positive electrodes and positive electrodes were obtained in the same manner as described in Example 11 except that the carbon material dispersions for secondary battery electrodes (2) to (18) and (19) to (24) were used. Then, the same evaluation was performed.

Example 21, Comparative Examples 17 to 20

Mixture inks for secondary battery positive electrodes and positive electrodes were obtained in the same manner as described in Example 11 except that 45 parts of $LiFePO_4$ as a positive electrode active material, 8.3 parts of a binder (polytetrafluoroethylene 30-J: manufactured by Dupont-Mitsui Fluorochemicals, Co., Ltd., a 60% aqueous dispersion), and 50 parts of water were used, and the conductive assistants and dispersants shown in Table 3A were used instead of not using the carbon material dispersion for secondary battery electrodes. Then, the same evaluation was performed.

Production of Negative Electrode for Lithium Secondary Batteries

Example 22

96 parts of artificial graphite as a negative electrode active material, 5 parts of a binder (polytetrafluoroethylene 30-J: manufactured by Dupont-Mitsui Fluorochemicals, Co., Ltd., a 606 aqueous dispersion), and 90 parts of water were mixed with 10 parts of the carbon material dispersion for secondary battery electrodes (1) prepared in Example 1 (1 part as solid content of acetylene black) to prepare a mixture ink for secondary battery negative electrodes. The mixture ink for negative electrodes was applied onto a current collector in the form of copper foil having a thickness of 20 μm with a doctor blade, followed by heating under reduced pressure and drying to adjust the thickness of an electrode to 100 μm. Rolling treatment with a roll press was performed to produce a negative electrode having a thickness of 85 μm. The evaluation was performed in the same manner as the case of the positive electrode. In this regard, the charge/discharge/storage characteristics were evaluated using a coin shaped battery for evaluation formed by using a negative electrode as a working electrode and using metal lithium foil as a counter electrode.

Example 38, Comparative Examples 21 and 29

Mixture inks for secondary battery negative electrodes and negative electrodes were obtained in the same manner as described in Example 22 except that the carbon material dispersions for secondary battery electrodes (19), (11) (24) prepared in Comparative example 1 as shown in Table 3B were used. Then, the same evaluation was performed.

Example 23, Comparative Examples 22 and 23

Mixture inks for secondary battery negative electrodes and negative electrodes were obtained in the same manner as described in Example 22 except that 96 parts of artificial graphite as a negative electrode active material, 5 parts of a binder (polytetrafluoroethylene 30-J: manufactured by Dupont-Mitsui Fluorochemicals, Co., Ltd., a 60% aqueous dispersion), and 90 parts of water were used, and the conductive assistants and dispersants shown in Table 3B were used instead of not using the carbon material dispersion for secondary battery electrodes. Then, the same evaluation was performed.

TABLE 3A

| | | Mixture inks for positive electrodes | | | | | | | | | |
|---|---|---|---|---|---|---|---|---|---|---|---|
| | | carbon material dispersion: 50 parts | | | | | | | | | |
| | active material 45 parts | conductive assistant 5 parts as solid content | dispersant 1 part as solid content | binder 5 parts as solid content | Conductive assistant 5 parts as solid content | dispersant 1 part as solid content | Grind gauge (μm) | Flexibility | adhesion | Charge/ discharge storage characteristic |
| Example 11 | $LiFePO_4$ | (1) | A | Synthesis Example 1 | 30-J | — | — | 30 | ○ | ○ | ○ |
| Example 12 | $LiFePO_4$ | (2) | A | Synthesis Example 2 | | | | 40 | ○ | ○ | ○ |
| Example 13 | $LiFePO_4$ | (3) | F | Synthesis Example 3 | | | | 40 | ○Δ | ○ | ○Δ |
| Example 14 | $LiCoO_2$ | (4) | A | Synthesis Example 4 | | | | 35 | ○ | ○ | ○ |
| Example 15 | $LiFePO_4$ | (5) | A | Synthesis Example 5 | | | | 40 | ○ | ○ | ○ |
| Example 16 | $LiFePO_4$ | (6) | A | Synthesis Example 6 | | | | 40 | ○ | ○Δ | ○ |
| Example 17 | $LiFePO_4$ | (7) | F | Synthesis Example 7 | | | | 45 | ○ | ○Δ | ○Δ |
| Example 18 | $LiFePO_4$ | (8) | A | Synthesis Example 8 | | | | 30 | ○ | ○ | ○ |
| Example 19 | $LiFePO_4$ | (9) | A | Synthesis Example 9 | | | | 40 | ○Δ | ○ | ○ |
| Example 20 | $LiFePO_4$ | (10) | A | Synthesis Example 10 | | | | 35 | ○ | ○ | ○ |
| Example 21 | $LiFePO_4$ | | — | | | A | Synthesis Example 1 | 45 | ○Δ | ○Δ | Δ |
| Example 33 | $LiFePO_4$ | (19) | A | Synthesis Example 15 | | — | — | 35 | ○ | ○ | ○ |
| Example 34 | $LiFePO_4$ | (20) | A | Syncheses Example 16 | | | | 40 | ○Δ | ○ | ○ |

TABLE 3A-continued

Mixture inks for positive electrodes carbon material dispersion: 50 parts

| | active material 45 parts | | conductive assistant 5 parts as solid content | dispersant 1 part as solid content | binder 5 parts as solid content | Conductive assistant 5 parts as solid content | dispersant 1 part as solid content | Grind gauge (μm) | Flexibility | adhesion | Charge/discharge storage characteristic |
|---|---|---|---|---|---|---|---|---|---|---|---|
| Example 35 | LiFePO₄ | (21) | A | Synthesis Example 17 | | | | 35 | ○ | ○ | ○ |
| Example 36 | LiFePO₄ | (22) | A | Synthesis Example 18 | | | | 35 | ○ | ○ | ○ |
| Example 37 | LiFePO₄ | (23) | A | Synthesis Example 19 | | | | 40 | ○Δ | ○ | ○ |
| Comparative example 9 | LiFePO₄ | (11) | A | Synthesis Example 11 | 30-J | — | — | 80 | Δ | Δ | x |
| Comparative example 10 | LiFePO₄ | (12) | F | Synthesis Example 12 | | | | 75 | Δ | Δ | Δ |
| Comparative example 11 | LiFePO₄ | (13) | A | Synthesis Example 13 | | | | 80 | Δ | Δ | x |
| Comparative example 12 | LiFePO₄ | (14) | A | Synthesis Example 14 | | | | 110 | x | Δ | x |
| Comparative example 13 | LiFePO₄ | (15) | A | — | | | | >150 | x | x | x |
| Comparative example 14 | LiFePO₄ | (16) | A | HEC | | | | 75 | Δ | ○ | Δ |
| Comparative example 15 | LiFePO₄ | (17) | F | — | | | | >150 | x | x | x |
| Comparative example 16 | LiFePO₄ | (18) | F | HEC | | | | 80 | Δ | Δ | x |
| Comparative example 17 | LiFePO₄ | | — | | | A | — | >150 | x | x | x |
| Comparative example 18 | LiFePO₄ | | — | | | F | HEC | 70 | Δ | ○ | Δ |
| Comparative example 19 | LiFePO₄ | | — | | | — | — | >150 | x | x | x |
| Comparative example 20 | LiCoO₂ | | — | | | A | Surfactant* | 90 | x | x | x |
| Comparative example 28 | LiFePO₄ | (24) | A | Synthesis Example 20 | | — | — | 75 | Δ | ○Δ | x |

Surfactant*: polyoxyethylene nonylphenyl ether, average number of oxyethylene groups: 9

TABLE 3B

Mixture inks for negative electrodes carbon material dispersion: 10 parts

| | active material 96 parts | | conductive assistant 1 part as solid content | dispersant 0.2 part as solid content | binder 5 parts as solid content | Conductive assistant 1 part as solid content | dispersant 0.2 part as solid content | Grind gauge (μm) | Flexibility | adhesion | Charge/discharge storage characteristic |
|---|---|---|---|---|---|---|---|---|---|---|---|
| Example 22 | Artificial graphite | (1) | A | Synthesis Example 1 | 30-J | — | — | 40 | ○ | ○ | ○ |
| Example 23 | Artificial graphite | | — | | | — | Synthesis Example 5 1 part as solid content | 40 | ○ | ○ | Δ |
| Example 38 | Artificial graphite | (19) | A | Synthesis Example 15 | | — | — | 40 | ○ | ○ | ○ |
| Comparative Example 21 | Artificial graphite | (11) | A | Synthesis Example 11 | 30-J | — | — | 80 | x | Δ | x |
| Comparative Example 22 | Artificial graphite | | — | | | — | — | >150 | x | x | x |
| Comparative Example 23 | Artificial graphite | | — | | | A | HEC | 60 | Δ | ○ | Δ |
| Comparative Example 29 | Artificial graphite | (24) | A | Synthesis Example 20 | | — | — | 80 | x | ○Δ | x |

As shown in Tables 3A and 3B, when the mixture ink for secondary battery electrodes of the present invention is used, the carbon material as a conductive assistant or the active material are uniformly dispersed in the mixture ink, thereby maintaining the balance between the flexibility and adhesion of the electrode. As for the battery characteristics, a decrease in discharge capacity after storage at 60° C. for 100 hours is suppressed. This is discussed as follows. When the dispersion control of the carbon material as a conductive assistant or the active material in the mixture ink is insufficient, a uniform conductive network is not formed when forming an electrode. Thus, resistance is distributed through the electrode attributable to partial cohesion, thereby resulting in concentration of current during use as a battery. This results in promotion of deterioration. Further, when the dispersion control of the carbon material as a conductive assistant or the active material is insufficient, the flexibility and adhesion of the electrode tend to be insufficient. Particularly, when the dispersion control of the carbon material as a conductive assistant is insufficient, the tendency is significant. Thus, when the mixture ink for secondary battery electrodes of the present invention is used, the carbon material as a conductive assistant or the active material is uniformly dispersed in the mixture ink. Accordingly, it is considered that improvement became possible.

Example 24

A mixture ink for secondary battery positive electrodes and a positive electrode were obtained in the same manner as described in Example 1 except that 45 parts of LiFePO$_4$ as a positive electrode active material, 5 parts of a binder (polytetrafluoroethylene 30-J: manufactured by Dupont-Mitsui Fluorochemicals, Co., Ltd., a 60% aqueous dispersion), and 50 parts of water were used, and 10 parts (2 parts as solid content) of an aqueous solution or aqueous dispersion of the amphoteric resin-type dispersant (1) described in Synthesis example (1) were used. Then, the same evaluation was performed.

Example 39, Comparative Examples 24 and 30

Mixture inks for secondary battery positive electrodes and positive electrodes were obtained in the same manner as described in Example 24 except that the dispersants shown in Table 4 or 2 parts of hydroxyethyl cellulose were used. Then, the same evaluation was performed.

Example 25

A mixture ink for secondary battery negative electrodes and a negative electrode were obtained in the same manner as described in Example 1 except that 94 parts of artificial graphite as a negative electrode active material, 7 parts of a binder (polytetrafluoroethylene 30-J: manufactured by Dupont-Mitsui Fluorochemicals, Co., Ltd., a 60% aqueous dispersion), and 90 parts of water were used, and 10 parts (2 parts as solid content) of an aqueous solution or aqueous dispersion of the amphoteric resin-type dispersant (1) described in Synthesis example (1) were used. Then, the same evaluation was performed.

Example 40, Comparative Examples 25 and 31

Mixture inks for secondary battery negative electrodes and negative electrodes were obtained in the same manner as described in Example 25 except that the dispersants shown in Table 4 or 2 parts of hydroxyethyl cellulose were used. Then, the same evaluation was performed.

Example 26

10 parts of acetylene black (Denka Black HS-100) as a carbon material (i.e., a conductive assistant), 5 parts (1 part as solid content) of an aqueous solution or aqueous dispersion of the amphoteric resin-type dispersant (1) described in Synthesis example (1), 4 parts of a binder (polytetrafluoroethylene 30-J: manufactured by Dupont-Mitsui Fluorochemicals, Co., Ltd., a 60% aqueous dispersion), and 81 parts of water were placed into a mixer for dispersion to prepare a composition for forming an underlayer for secondary battery electrodes. The dispersion degree was measured with a grind gauge. The composition for forming an underlayer was applied onto a current collector in the form of aluminum foil having a thickness of 20 μm with a doctor blade, followed by heating and drying to form an underlayer having a thickness of 8 μm. Subsequently, the mixture ink for secondary battery positive electrodes of Example 17 was applied onto the underlayer, followed by heating under reduced pressure and drying to prepare a positive electrode in the same manner as described in Example 17. Then, the same evaluation was performed.

Example 27, Comparative Example 26

Compositions for forming an underlayer for secondary battery electrodes were obtained in the same manner as described in Example 26 except that the dispersants shown in Table 4 or 1 part of hydroxyethyl cellulose were used. Then, the same evaluation was performed. Subsequently, the mixture ink for secondary battery positive electrodes of Table 4 was applied onto the underlayer, followed by heating under reduced pressure and drying to prepare positive electrodes in the same manner as described in Example 17. Then, the same evaluation was performed.

TABLE 4

| | | active material | conductive assistant | binder | dispersant | Grind gauge (μm) | Flexibility | adhesion | Charge/ discharge storage characteristic |
|---|---|---|---|---|---|---|---|---|---|
| Example 24 | Mixture ink for positive electrode | LiFePO$_4$ | — | 30-J | Synthesis Example 1 | 40 | ○ | ○Δ | ○ |
| Example 39 | Mixture ink for positive electrode | LiFePO$_4$ | | | Synthesis Example 15 | 40 | ○ | ○Δ | ○ |
| Example 25 | Mixture ink for negative electrode | Artificial graphite | | | Synthesis Example 1 | 40 | ○ | ○Δ | ○ |

TABLE 4-continued

| | | active material | conductive assistant | binder | dispersant | Grind gauge (μm) | Flexibility | adhesion | Charge/discharge storage characteristic |
|---|---|---|---|---|---|---|---|---|---|
| Example 40 | Mixture ink for negative electrode | Artificial graphite | | | Synthesis Example 15 | 40 | ○ | ○Δ | ○ |
| Example 26 | underlayer | — | A | 30-J | Synthesis Example 1 | 30* | ○ | ○ | ○ |
| | Mixture ink for positive electrode | Mixture ink for positive electrode of Example 17 | | | | | | | |
| Example 27 | underlayer | — | A | 30-J | Synthesis Example 2 | 35* | Δ | ○Δ | ○Δ |
| | Mixture ink for positive electrode | Mixture ink for positive Comparative Example 10 | | | | | | | |
| Comparative Example 24 | Mixture ink for positive electrode | LiFePO$_4$ | — | 30-J | HEC | 80 | Δ | Δ | x |
| Comparative Example 30 | Mixture ink for positive electrode | LiFePO$_4$ | | | Synthesis Example 20 | 80 | Δ | ○Δ | x |
| Comparative Example 25 | Mixture ink for negative electrode | Artificial Graphite | | | HEC | 75 | Δ | Δ | Δ |
| Comparative Example 31 | Mixture ink for negative electrode | Artificial Graphite | | | Synthesis Example 20 | 75 | Δ | ○Δ | x |
| Comparative Example 26 | underlayer | — | A | 30-J | HEC | 75* | x | Δ | x |
| | Mixture ink for positive electrode | Mixture ink for positive electrode of Comparative Example 10 | | | | | | | |

*is value of a composition for forming an underlayer.

As shown in Table 4, when the composition for forming a secondary battery electrode of the present invention was used, dispersion control in the mixture ink was sufficiently performed even in the absence of the conductive assistant. As a result, a uniform conductive network is formed when forming an electrode, thereby maintaining the balance between the flexibility and adhesion of the electrode. As for the battery characteristics, a decrease in discharge capacity after storage at 60° C. for 100 hours is considered to be suppressed. Since the conductive assistant is not used, the ratio of the active material contained in the mixture ink can be improved. This is considered to lead to the improvement in the capacity of the battery.

Further, it is found that when the composition for forming a secondary battery electrode of the present invention is used for the underlayer, the electrode becomes good as compared with evaluation results in Example 17 and Comparative example 10 (not using the underlayer). This is considered because the composition for forming a secondary battery electrode of the present invention allowed the adhesion of the current collector to the mixture layer to be more uniform and firm. However, in Comparative example 26, the dispersion state of the composition for forming a secondary battery electrode for the underlayer is insufficient. In the case of forming an electrode, it was inferior to the evaluation result of Example 17. This is considered because the adhesion state of the current collector to the mixture layer became insufficient, and thus the state of the electrode became non-uniform as compared with the case of not using the underlayer.

The invention claimed is:

1. A composition which contains at least one of an electrode active material (A) and a carbon material (B) as a conductive assistant; an aqueous liquid medium (D); and an amphoteric dispersant (C) prepared by neutralizing at least some carboxyl groups in a copolymer obtained by copolymerizing the following monomers with a basic compound:
    ethylenically unsaturated monomer having an aromatic ring (c1), which is selected from styrene, α-methylstyrene, and benzyl(meth)acrylate: 5 to 70% by weight;
    ethylenically unsaturated monomer having a carboxyl group (c2), which is selected from maleic acid and alkyl monoesters thereof, fumaric acid and alkyl monoesters thereof, itaconic acid and alkyl monoesters thereof, citraconic acid and alkyl monoesters thereof, phthalic acid β-(meth)acryloxyethyl monoester, isophthalic acid β-(meth)acryloxyethyl monoester, terephthalic acid β-(meth)acryloxyethyl monoester, succinic acid β-(meth)acryloxyethyl monoester, acrylic acid, methacrylic acid, crotonic acid, and cinnamic acid: 15 to 60% by weight;
    ethylenically unsaturated monomer having an amino group (c3), which is selected from dim ethylaminoethyl (meth)acrylate, diethyl aminoethyl(meth)acrylate, methylethylaminoethyl(meth)acrylate, dimethylamino styrene, and diethylamino styrene: 1 to 80% by weight; and
    other monomer (c4) except the monomers (c1) to (c3), which is selected from alkyl(meth)acrylate, 2-hydroxyethyl(meth)acrylate, 4-hydroxybutyl(meth)acrylate and alkylene glycol(meth)acrylate: 0 to 79% by weight, wherein the total of the monomers (c1) to (c4) are 100% by weight.

2. The compound of claim 1, wherein the ethylenically unsaturated monomer (c2) is selected from methacrylic acid and acrylic acid.

3. The composition of claim 1, wherein the composition contains 0 wt % of the other monomer (c4).

4. The composition of claim 1, wherein the other monomer (c4) is selected from alkyl(meth)acrylate and alkylene glycol(meth)acrylate.

5. The composition of claim 4, wherein the other monomer (c4) is selected from methyl(meth)acrylate, ethyl(meth)acrylate, propyl(meth)acrylate and butyl(meth)acrylate.

6. The composition of claim 4, wherein the other monomer (c4) is selected from diethylene glycol mono(meth)acrylate, polyethylene glycol mono(meth)acrylate, methoxy ethylene glycol(meth)acrylate, methoxy diethylene glycol (meth)acrylate and phenoxyethylene glycol(meth)acrylate.

7. The composition of claim 1, wherein the basic compound is an amine compound or a hydroxide of an alkali metal.

8. The composition of claim 7, wherein the basic compound is selected from ammonia, dimethylaminoethanol, diethanolamine, and triethanolamine.

9. The composition of claim 1, wherein a degree of said neutralizing is from 75% to 100%.

10. The composition of claim 1, wherein the ethylenically unsaturated monomer (c1) is selected from styrene, α-methylstyrene and benzyl methacrylate; the ethylenically unsaturated monomer (c2) is selected from acrylic acid, methacrylic acid, maleic acid, fumaric acid, itaconic acid, citraconic acid, phthalic acid β-(meth)acryloxyethyl monoester, isophthalic acid β-(meth)acryloxyethyl monoester, terephthalic acid β-(meth)acryloxyethyl monoester, succinic acid β-(meth)acryloxyethyl monoester, crotonic acid, and cinnamic acid; and the ethelynically unsaturated monomer (c3) is selected from dimethylaminoethyl(meth)acrylate, diethyl aminoethyl(meth)acrylate, methylethylaminoethyl(meth)acrylate, dimethylamino styrene, and diethylamino styrene.

11. The composition of claim 10, wherein the composition contains 0 wt % of the other monomer (c4).

12. The composition of claim 10, wherein the other monomer (c4) is selected from butyl(meth)acrylate, 4-hydroxy butyl(meth)acrylate and polyethylene glycol mono (meth)acrylate.

13. The composition of claim 10, wherein the basic compound is selected from ammonia and dimethylaminoethanol.

14. The composition of claim 10, wherein a degree of said neutralizing is from 75% to 100%.

15. An electrode comprising a current collector and at least one of a mixture layer and an electrode underlayer formed from the composition according to claim 1.

16. A secondary battery comprising a positive electrode, a negative electrode, and an electrolyte, wherein at least one of the positive electrode and the negative electrode is the electrode according to claim 15.

* * * * *